United States Patent [19]

Boscan-Romero et al.

[11] Patent Number: 5,139,823
[45] Date of Patent: Aug. 18, 1992

[54] PROCESS FOR REDUCING SCALE FORMATION IN VINYL POLYMERIZATION REACTORS

[75] Inventors: Neida C. Boscan-Romero; Jose L. Corcuera-Casas; Edgar R. Gonzalez-Acevedo; Enrique J. Millan-Barrios; Rafael A. Qintero-Arcaya, all of Maracaibo, Venezuela

[73] Assignee: Investigacion y Desarrollo C.A., El Tablazo, Venezuela

[21] Appl. No.: 565,075

[22] Filed: Aug. 9, 1990

[51] Int. Cl.$^5$ .................. B05D 7/22; C08F 2/00
[52] U.S. Cl. .................. 427/236; 427/230; 427/237; 427/239; 427/314; 427/318; 427/422; 526/62
[58] Field of Search ............ 427/237, 230, 239, 236, 427/422, 314, 318; 422/241; 526/62

[56] References Cited

U.S. PATENT DOCUMENTS

| | | | |
|---|---|---|---|
| 4,080,173 | 3/1978 | Cohen | 427/230 |
| 4,200,712 | 4/1980 | Cohen | 427/230 |
| 4,228,130 | 10/1980 | Cohen | 427/230 |
| 4,256,864 | 3/1981 | Cohen | 526/62 |
| 4,263,421 | 4/1981 | Jones | 427/230 |
| 4,579,758 | 4/1986 | Dorsch et al. | 428/35 |
| 4,622,245 | 11/1986 | Shimizu et al. | 427/230 |

FOREIGN PATENT DOCUMENTS 1181899  1/1985  Canada.
54-107991  8/1979  Japan.

Primary Examiner—Janyce Bell
Attorney, Agent, or Firm—Pennie & Edmonds

[57] ABSTRACT

The present invention refers to a process for the preparation of a scale inhibiting solution that consists of: a) a low molecular weight compound belonging to the families of the polyhydroxybenzyls, polyhydroxyarylethers, its copolymers or blends b) an alkali and c) a strong electrolyte, which is used to coat the internal surfaces of polymerization reactors. This scale inhibiting solution reduces effectively the adherence of polymeric material to the inner parts of the reaction vessel when monomers such as vinylics, vinylidenes, acrylics, methacrylics, vinylaromatics, diolefins and their mixtures are polymerized via suspension, microsuspension, dispersion or emulsion.

14 Claims, No Drawings

PROCESS FOR REDUCING SCALE FORMATION IN VINYL POLYMERIZATION REACTORS

BACKGROUND OF THE INVENTION

The present invention refers to a process for the production of an alkaline solution of polyhydroxybenzyls, polyhydroxyarylethers, its copolymers or mixtures, which is used to coat the internal surface of vinylic monomer polymerization reactors and has the effect of preventing the accumulation of the polymer on the walls of the reaction vessel.

In the industrial production of vinyl polymers a great variety of chemical procedures are used, among which are particularly relevant to our invention those via suspension, dispersion, microsuspension and emulsion. In those procedures, the reaction medium consists mainly of: water, suspension agents, dispersants or emulsifiers (depending on the case) and one or several substituted monomers of ethylene (typically insoluble in water).

Depending on how stable that heterogeneous and discontinuous medium is, vigorous shaking or other kinds of devices might be needed to keep separated the small entities rich in monomer), where the chemical transformation is carried out. Given the unstabilities associated with the heterogeneous medium or with the imperfections in the homogenizing flux pattern, some polymer particles may tend to separate from the bulk of the solution and to adhere to the inner surfaces of the reactor. As this polymer remains adhered during several reaction cycles, it can cross-link (form a polymer of larger molecular weight than the initial one), and serve as a seed for gradual accumulation of more material.

The adherence of polymeric material to the walls of a reaction vessel as well as to the stirring accessories (rods, flux-breakers, etc) can reduce the quality of the polymer being prepared. The material adhered to those surfaces affects the process in several ways: it reduces thermal conduction between the heat transfer system and the reaction medium, it can affect the homogenizing performance of the mixing elements, by modifying their effective shapes and sizes, and it alters the optical and mechanical properties of the final product when it peels off the walls and passes to the polymer bulk, since such granules are substantially harder and less porous than the normal polymer. Besides, the accumulation of scales must be reduced to a maximum since: 1) its removal implies an extra downtime and consequently a deceleration of production, 2) the opening of the reactor mouth for its proper cleaning (mechanical and/or with presurized water), allows the release of the monomer to the plant environment, which hinders the maintenance of monomer concentration within the stipulated limits for environmental protection and industrial safety regulations, and contributes to lower the efficiency of the process through the waste of reactant.

Several products have been patented to be used as coatings for polymerization reactors in order to prevent the accumulation of polymer on their surfaces, among which we can mention: the U.S. Pat. No. 4,256,864, which consists of the application of an aqueous solution of a complex, this complex results from mixing a hydrophilic uncross-linked polymer (as polyvinyl alcohol or hydroxypropyl methyl cellulose) with an inhibitor such as a disodium salt of bisfenol A or glucose thiosemicarbazone; in this case the use of an inhibitor brings as a consequence the necessity of rinsing carefully the excess of solution so that it does not affect the polymerization reaction in an undesirable way; the U.S. Pat. No. 4,579,758, in which the base substance for the coating is an oligomer, obtained from the condensation of benzaldehyde and resorcinol, here, the apparently limited commercial availability of the oligomer suggests its production in plant; the U.S. Pat. No. 4,622,245, which utilizes as surface coating the blend of a polymeric compound which contains hydroxyl groups (such as polyvinyl alcohol) and a derivative of salicylic acid, however its use is conditioned to preheating the surfaces of the reactor at temperatures between 40° to 100° C., rinsing carefully after the coating application; and the Canadian Patent CA-1,181,899 (equivalent to the Japanese original JP-54-107991), which deals with the use of phenol-formaldehyde resins, and which is classified by the patent literature as of moderate performance (U.S. Pat. No. 4,431,783).

This short summary of the state of the art shows the extensive variety of compounds and methods used in the area of polymerization reactor coating. However, new materials and procedures are under study aiming at effectively diminishing the formation of scales.

DETAILED DESCRIPTION

The invention we are describing herewith mainly deals with the preparation of a solution which contains the following chemical species:

a) A compound belonging to the families of the polyhydroxybenzyls, polyhydroxyarylethers, its copolymers or blends, the concentration of which varies between 0.01-50% and corresponds to the following structure: $[—\Phi—R—]n$, in which $\Phi$ stands for any phenolic radical containing from 1 to 4 substituents of the type: halogen, hydrogen, substituted benzyl, alkane of up to 8 atoms of carbon, alcohol of up to 4 atoms of carbon, ester of up to 8 atoms of carbon, an acid or aldehyde radical, a polyoxymethylene oligomer, or any of its combinations; R can be a divalent organic group as $—CH_2—O—CH_2—$, $—CH_2—$, and n, takes values between 1 and 50.

b) An alkali like NaOH, KOH, LiOH, $NH_4OH$, $Na_{(3-y)}H_{(y)}PO_4$ type (y=0,1,2) in a concentration between 0.01-30% and c) A strong electrolyte such as an alkaline metal halide in concentration between 0.01-25%.

All concentrations are given in this document on weight basis unless otherwise specified.

The combination of these chemical species (all of them widely available on the market) takes place in an aqueous medium at room temperature.

The solution thus prepared shows a surface tension lower than 72 dynes/cm and a contact angle between the solution and the solid surface close to zero; these parameters are very important in the coating field since the tendency of a liquid to spread over a solid surface depends essentially on these two quantities. The resulting layer is quite thin (around several microns) and colorless, noteworthy features of our invention since the micrometric thickness of the layer allows easy heat exchange between the reaction medium and the temperature control system, and the transparency of the coating indicates that it does not color the polymer.

We have determined that an important factor for the optimization of the scale inhibiting performance of the solution is to fix its ionic strength in such margins that the electrolyte concentration is between 0.01 to 25%

(depending on the base-compound). This must be related to the polyelectrolytic nature of the compounds being used. This factor does not seem to have been taken into consideration in some previous inventions.

This scale inhibiting solution when applied on the internal surfaces of the polymerization reactor has the effect of reducing almost completely the accumulation of polymeric material on the polymerization reactor's walls and stirring devices without affecting the rate of the reaction (even in the case when the excess of solution from the coated surface has not been removed). The synthesis of the polymer can be carried out in suspension, dispersion, microsuspension, or emulsion, and the polymerized monomers can be of the following type: a) vinyl, such as vinyl halides (for example vinyl chloride or vinyl bromide), b) vinylidenes, such as vinylidene halides (for example vinylidene chloride and vinylidene bromide), c) vinylesters, such as acrylic acid esters $H_2C=CHCOOC_mH$ ($2m+1$) with $m=1-8$], d) acrylonitriles, such as acrylonitrile and methyl acrylonitrile, e) methacrylates, such as alquilesters of methacrylic acid [$H_2C-CCH_3COOC_mH$ ($2m+1$) with $m=1-8$], f) vinylaromatics, such as styrene, $\alpha$-methylstyrene, vinyltoluene and vinylnaphthalene, and g) diolefins of the butadiene type, isoprene and chloroprene.

The surfaces to be impregnated must be clean in order to optimize the coating effect of the solution, but it is not necessary to carry out an abrasive treatment previous to the use of our product. Thus, additional solution can be applied before initiating subsequent polymerization reactions to renew the effectiveness of the coating.

Unlike other inventions, equally original, such as the U.S. Pat. No. 4,622,245, where preheating of the reactor walls to a temperature between 40° and 100° C. is required, we have found that the coating efficiency of our invention does not vary in a noticeable way when it is applied with or without previous tempering of the materials to be coated and/or of the scale inhibiting solution. On the other hand, the solution can be prepared and stored over long periods ($\leq 1$ year) without reducing its scale inhibiting efficiency and all this with no addition of antioxidants.

The quality of the coating does not seem to be affected when the pH of the medium of reaction lies between 3 and 12 units, this is particularly relevant since one of the major components in the suspension, microsuspension, dispersion and emulsion reactions is water for which the pH may change during or between reactions.

Among the variety of processes used in the polymer production industry two of them are the batch and the closed reactor processes. Our invention performs rather well on either process —see EXAMPLES—, since in the case of the batch process the application of the scale inhibiting solution can be done manually or mechanically (with a spray gun, for example) with the advantage that it does not require the heating of the reactor walls once the solution has been applied. In the case of a closed reactor process, the coating solution can be applied mechanically (using a sprayer for example) or using alternatively steam injection. In the application procedures which have been mentioned is not required drying the walls of the reactor in order to continue producing polymer. This characteristic is of outmost importance in the case of closed reactors, as the drying process (conceivably through the heating of the interior of the reactor) could mean an additional downtime which would attempt against the real purpose for which the equipment was designed.

Once the scale inhibiting solution has been applied to the surfaces of interest, the operational directions can be applied at once, with the accompanying benefit of decreasing the downtime periods due to the feasibility of automatic application of the coating material as soon as the reactor has been emptied and the convenience of not having to dry and/or to treat thermically the coating, previous to the reaction process itself.

The examples we are quoting below are based upon experiments on the production of polyvinylchloride in suspension and are merely of an illustrative nature; it must be understood that the coating described in this present document is equally applicable to the processes of polymerization and copolymerization of a wide variety of substituted ethylene monomers.

EXAMPLES

Several types of oligomers belonging to the families of the polyhydroxybenzyls and of the polyhydroxybenzylethers have been tried out, and excellent inhibiting properties for the formation of polymer accumulation on the surfaces in contact with the reaction medium, have been found.

EXAMPLE 1

The walls and stirring equipment of the reaction vessel were mechanically cleaned. Some solutions were prepared for which the relation of polyhydroxybenzyl (slightly branched; substitution degree of the aromatic ring approximately equal to 2.2) to NaOH was 1:3. Several experiments were carried out with the molecular weight of the material ranging between 1,000 to 3,000 grs/mol, with a hydroxide number oscillating between 1.2 and 5.0 for every 100 grs/compound; and where the ionic strength of the medium was adjusted using a strong electrolyte, as NaCl, KCl, NH$_4$Cl in concentrations between 0.01 to 25%. The solution was sprayed over all the parts of the system which were expected to get in contact with the reaction medium. Then, the excess of solution was rinsed, the reactor was drained and the synthesis of the polymer was started at once. The polymerization of monovinylchloride (MVC), was performed with a relation of monomer to water of 1:1.7. A hydroxypropyl methyl cellulose suspension was used as suspension agent (HPMC) in a concentration of 0.54 (grs/lt H$_2$O) and as a initiator lauril peroxide was selected in a solution of 20% in dichloroethane (0.36% on monomer weight basis). The maximum temperature of the reaction was 60° C. The resulting polymer presented a K value of 67 in cyclohexanone at 30° C.

The quality control analyses of the polymer (porosity, distribution of particle size, etc), showed that there was not significant difference with others polymers prepared using a control procedure, and particularly the properties of the final product were not affected. Experiments were also executed without the elimination of the excess of scale inhibiting solution from the surfaces, with similar results. The surfaces in contact with the medium of reaction presented an aspect which could be classified as : a) smooth (absence of scaled polymer) and b) terse (presence of a fine powder at touch and easily removable). The condition of the surfaces are described in Table I

TABLE I

CONDITION OF THE SURFACES OF THE REACTION VESSEL AFTER THE SYNTHESIS OF PVC (*)

| PARTS | CLASSIFICATION |
|---|---|
| UPPER CAP | SMOOTH |
| CYLINDRICAL PART | TERSE |
| STIRRER | SMOOTH |

(*) In the areas were residues of polymer were found the layers which contained them were very thin (less than 0.5 mm) and the total covered area in no case was greater than 0.5% of the exposed area.

EXAMPLE 2

In the present case a follow-up was made to the performance of the product of Example 1 in relation to a control recipe for a chain of several dozens of reactions. After each reaction the coating was renewed, the excess was removed on the surfaces and the reactor was drained in order to proceed later on to the execution of another polymer synthesis. The quality of the synthesized polymer remained constant (for all effects) during that train of experiments. During the control process, it was necessary at about the fifteenth reaction to perform a mechanical cleaning whereas in the twentieth, mechanical cleaning and additional removal with pressurized water was required. With our product of Example 1, the mechanical cleaning were more spaced and no pressurized water was required.

EXAMPLE 3

In order to determine the chemical inertness of the scale inhibiting solution toward air oxygen during long storage periods ($\leq 1$ year), trials were run for a year period taking out aliquotes at monthly intervals from a solution kept at room temperature in a glass container. The preparation of the mother solution, the application of each aged solution and the polymerization procedure were all as described in Example 1. In each case, the results obtained were similar to those of Table I.

EXAMPLE 4

In this type of experiment, it was studied the dependence of the coating performance of our invention with the degree of oxidation of the methyol groups and/or the presence of significant amounts of —COOH and —COH groups. In a reaction vessel were added the compound of Example 1, $KM_nO_4$, KOH and water in a relation 0.10:0.05:0.05:100, respectively. The mixture was refluxed for approximately two hours. The reaction product contained a substantial proportion of acid and aldehyde groups as it was verified through spectroscopic analyses (IR and NMR). The preparation and application of the scale inhibiting solution and the execution of the polymer synthesis were made in an analogous way to the one described in Example 1. The results were similar to those indicated in Table I.

EXAMPLE 5

In a set of experiments made in order to determine the influence of acidity of the medium over the scale inhibiting ability of our invention, several polymerization reactions of MVC like in Example 1 were performed varying the pH of the reaction medium between 3 and 12, using for that purpose different types of buffer systems ( for example, mixtures of phosphoric acid and phosphate salts). In each case similar results to those of Table I were obtained.

EXAMPLE 6

A solution with the composition ratio of polyhydroxybenzylether (moderately trisubstituted, average degree of substitution of the aromatic ring approximately equal to 2.4) to NaOH was 2:1. The preparation and application of the scale inhibiting solution and the execution of the polymer synthesis were made in an analogous way to that described in Example 1. The results were similar to those described in Table I.

EXAMPLE 7

A solution in which the scale inhibiting agent was an oligomer of a branched polyhydroxybenzylether (average degree of substitution of the aromatic ring equal to 2.7), was prepared by mixing it with potassium hydroxide in a 1:2 proportion. The reactor walls were then treated with high temperature steam and immediately the coating solution was applied . Once finished with the impregnation of all inner parts of the reaction vessel, a reaction was performed where the relation MVC: water was 1:2, that of HPMC of 0.74 (gr/lt $H_2O$) and that of lauric peroxide of 0.54% (on weight monomer basis). The properties of the polymer: K-value, porosity, particle size distribution and appearance, were the same as to those obtained in a control experiment. Once the reaction had concluded, the condition of the reactor and of its stirring devices were essentially equal to those described in Table I of Example 1.

EXAMPLE 8

A solution of a chlorinated polyhydroxybenzyl slightly branched; substitution degree of the aromatic ring approximately equal to 2.2) and with a chlorine content of 9%, was mixed with NaOH until a concentration relation of 2:3 was reached. The average molecular weight of the polychlorohydroxiaril was 2,000 gr/mol.

The application of the scale inhibiting solution and the protocole for the synthesis of the polymer were carried in an analogous way to that described in Example 1. The results were similar to those indicated in Table I.

EXAMPLE 9

A solution of an essentially linear polyhydroxymethylbenzyl (substitution degree of the aromatic ring approximately equal to 2.2) was mixed with NaOH in order to get a 3 to 5 relation. The average molecular weight of the polyhydroximethylbenzyl was 2,700 gr/mol. The resulting solution was applied and the synthesis was performed according to what has been described in Example 1. The results were similar to those indicated in Table I.

EXAMPLE 10

A copolymer of polyhydroxibenzyl grafted with polyoxymethylene was used as an scale-inhibitor in a solution with composition ratios of 1 to 2 in polymer and KOH, respectively. The resulting solution was applied and the synthesis was performed according to what has been described in Example 1. The results were similar to those indicated in Table I.

We claim:

1. A process for preventing or substantially reducing the formation of scale on the inner surfaces of a polymerization reactor which comprises coating the inner surfaces of the reactor with an aqueous alkali metal hydroxide solution containing a) an electrolyte of an alkali metal halide in a concentration of between about 0.01 to 25 percent by weight of the solution, and b) a polyhydroxy benzyl, a polyhydroxy benzyl ether, or a copolymer or mixture thereof, wherein the solution is applied to the inner surfaces of the reactor by steam injection.

2. A process according to claim 1, which further comprises utilizing the following chemical species in the indicated ratios:
   a. a polyhydroxybenzyl, a polyhydroxybenzylether or a copolymer or mixture thereof, at a concentration of about 0.01 to 50% and having the structure $[-\Phi-R-]_n$, where $\Phi$ is any phenolic radical containing from 1 to 4 substituents of the type: halogen, an alkane of up to 8 carbon atoms, an alcohol of up to 4 carbon atoms, an ester of up to 8 carbon atoms, an acid or aldehyde radical, or a polyoxymethylene oligomer; R is a divalent organic group such as $-CH_2-O-CH_2-$ or $-CH_2-$, and n ranges from 1 to 50;
   b. an alkali metal hydroxide solution of NaOH, KOH, LiOH, $NH_4OH$, $Na_{(3-y)}H_{(y)}PO_4$ (y-0,1,2) at a concentration of about 0.01 to 30%; and
   c. an electrolyte of an alkali metal halide at a concentration of about 0.01 to 25%.

3. A process according to claim 1, which further comprises conducting a polymerization reaction of a substituted ethylene polymer belonging to groups such as: a) vinyls or vinyl halides, b) vinylidenes or vinylidene halides, c) vinylesters, d) acrylonitriles, e) methacrylates, f) vinylaromatics, and g) diolefins of butadiene isoprene or chloroprene is the reactor after the coating is applied.

4. A process according to claim 3, wherein the polymerization reaction takes place in suspension, microsuspension, dispersion, or emulsion.

5. A process according to claim 3, wherein the maximum temperature of polymerization reaction lies between 0° and 120° C.

6. A process according to claim 3, wherein vinylchloride monomer is polymerized in suspension.

7. A process according to claim 1, wherein the alkali metal hydroxide is NaOH, KOH or LiOH.

8. A process according to claim 1, wherein the electrolyte is NaCl, KCl, or $NH_4Cl$.

9. A process according to claim 1 wherein the solution has a surface tension of lower than 72 dynes/cm and a contact angle with water of about zero.

10. A process according to claim 1 which further comprises maintaining the surfaces of the reactor to be coated at a temperature of between 20° and 100° C.

11. A process according to claim 1 which further comprises applying several layers of coating to the reactor surfaces prior to the start of a series of polymerization reactions.

12. A process according to claim 11 which further comprises conducting polymerization reactions after the coating has been applied without having to dry or thermally treat the coating.

13. A process according to claim 12 which further comprises applying the coating in an amount which does not affect the rate of the polymerization reaction.

14. A process according to claim 12 which further comprises renewing the effectiveness of the coating before initiating a subsequent polymerization reaction by applying additional solution to the inner surfaces of the reactor.

* * * * *